United States Patent [19]

Henn et al.

[11] Patent Number: 5,525,636

[45] Date of Patent: Jun. 11, 1996

[54] EXPANDABLE STYRENE POLYMERS

[75] Inventors: Rolf Henn, Ketsch; Klaus Hahn, Kirchheim; Wolfgang Loth, Bad Dürkheim; Walter Heckmann, Weinheim; Uwe Blumenstein, Schornsheim; Hans-Dieter Schwaben, Freisbach; Karl-Heinz Wassmer, Limburgerhof; Hermann Tatzel, Weinheim, all of Germany

[73] Assignee: BASF Aktiengesellschaft, Ludwigshafen, Germany

[21] Appl. No.: 439,899

[22] Filed: May 12, 1995

[30] Foreign Application Priority Data

May 13, 1994 [DE] Germany ............. 44 16 861.6

[51] Int. Cl.$^6$ ........................................ C08J 9/16
[52] U.S. Cl. ........................ 521/59; 521/56; 521/60; 521/149; 521/150
[58] Field of Search ................... 521/56, 59, 60, 521/149, 150

[56] References Cited

U.S. PATENT DOCUMENTS

| | | | |
|---|---|---|---|
| 3,281,383 | 10/1966 | Zelunski et al. | 280/23.7 |
| 4,282,334 | 8/1981 | Walter et al. | 525/53 |
| 4,363,881 | 12/1982 | Smith | 521/59 |
| 4,692,471 | 9/1987 | Fudge | 521/59 |
| 4,937,272 | 6/1990 | Sumitomo | 521/59 |

FOREIGN PATENT DOCUMENTS

| | | |
|---|---|---|
| 106129 | 4/1984 | European Pat. Off. . |
| 343473 | 11/1989 | European Pat. Off. . |
| 561216 | 9/1993 | European Pat. Off. . |
| 3814783 | 4/1988 | Germany . |
| 4124207 | 7/1991 | Germany . |

OTHER PUBLICATIONS

H. G. Elias, *Makromuleküle*, 1971, pp. 52–64.
Echte, "Rubber-Toughened Styrene Polymers", *Advances in Chemistry*, Series No. 222, 1989.

*Primary Examiner*—Morton Foelak
*Attorney, Agent, or Firm*—Keil & Weinkauf

[57] ABSTRACT

The invention relates to expandable styrene polymers for elastic polystyrene foams, comprising a) from 75 to 98% by weight of polystyrene and/or a styrene copolymer containing at least 50% by weight of copolymerized styrene, b) from 2 to 25% by weight of at least one styrene-soluble elastomer, c) from 1 to 15% by weight, based on the sum of a) and b), of a low-boiling blowing agent, and, if desired, d) conventional additives in effective amounts, where the unfoamed beads have a structure in which the elastomer phase is dispersed in the polystyrene phase in the form of cell particles, and to foams and foam moldings produced therefrom.

6 Claims, No Drawings

EXPANDABLE STYRENE POLYMERS

The present invention relates to expandable styrene polymers which are suitable for the production of elastic foams.

Foams based on polystyrene have achieved considerable industrial importance as thermal insulation and packaging materials. They are produced on an industrial scale by first preparing expandable styrene polymers by suspension polymerization of styrene in the presence of a blowing agent, expanding these polymers by heating to give foam particles, and subsequently welding the particles in molds to give moldings.

Polystyrene foams are rigid. Their low elasticity is disadvantageous for many applications, for example in the packaging sector, since protection of the packaged goods against impact is only possible to an inadequate extent, and the foam parts can break when deformed.

Attempts have therefore already been made in the past to increase the elasticity of polystyrene foams.

EP-A-561 216 describes a process for elastifying polystyrene foams, in which foam slabs having a density from 8 to 12 kg/m$^3$ are compressed to about ⅓ of their size and then released again. Boards cut from the slabs treated in this way have increased elasticity and are used, for example, for solid-borne sound insulation. However, the technicalities of the process mean that this procedure is very difficult to apply to moldings and is therefore not carried out.

U.S. Pat. No. 4,424,285 and U.S. Pat. No. 4,409,338 describe foamable styrene polymers which are prepared by polymerization of a solution of from 0.5 to 4.0% by weight of styrene-butadiene or styrene-butadiene-styrene block copolymers in styrene and which have a short mold cooling time.

However, this only increases the elasticity of the foams to an insignificant extent due to the small amount of rubber added.

In U.S. Pat. No. 4,307,134 and U.S. Pat. No. 4,333,970, shells of styrene-butadiene copolymers are polymerized onto polystyrene beads with partial grafting, and the resultant beads are impregnated with blowing agent and subsequently expanded. However, the resultant foams have an irregular cell structure and unsatisfactory mechanical properties.

GB-A-1,220,611 describes a foamable polymer composition having increased oil resistance which comprises a styrene-acrylonitrile copolymer and a polybutadiene elastomer, where the styrene-acrylonitrile copolymer is dispersed in the elastomer and the blowing agent is absorbed in the elastomer phase with swelling and partial dissolution. However, such foams have unsatisfactory mechanical properties.

DE 38 14 783 discloses elastic foams comprising foamed interpolymers of polyolefins with styrene.

In all the prior-art processes described, the blowing agent diffuses out of the beads very rapidly. After only a few days, the loss of blowing agent can be so large that proper foaming of the beads is no longer possible.

It is an object of the present invention to provide expandable styrene polymers which are suitable for the production of elastic foams, do not lose significant amounts of blowing agent even after extended storage, and are recyclable.

We have found that this object is achieved by expandable styrene polymers for elastic polystyrene foams, comprising a) from 75 to 98% by weight of polystyrene and/or a styrene copolymer containing at least 50% by weight of copolymerized styrene, b) from 2 to 25% by weight of at least one styrene-soluble elastomer, c) from 1 to 15% by weight, based on the sum of a) and b), of a low-boiling blowing agent, and, if desired, d) conventional additives in effective amounts, where the unfoamed beads have a structure in which the elastomer phase is dispersed in the polystyrene phase in the form of cell particles.

The present invention accordingly provides expandable styrene polymers for elastic polystyrene foams, comprising a) from 75 to 98% by weight of polystyrene and/or a styrene copolymer containing at least 50% by weight of copolymerized styrene, b) from 2 to 25% by weight of at least one styrene-soluble elastomer, c) from 1 to 15% by weight, based on the sum of a) and b), of a low-boiling blowing agent, and, if desired, d) conventional additives in effective amounts, where the unfoamed beads have a structure in which the elastomer phase is dispersed in the polystyrene phase in the form of cell particles.

The present invention furthermore provides elastic foams having a density of from 5 to 70 g/l, comprising a) from 75 to 98% by weight of polystyrene and/or a styrene copolymer containing at least 50% by weight of copolymerized styrene, b) from 2 to 25% by weight of at least one styrene-soluble elastomer, and, if desired, c) conventional additives in effective amounts, the preparation of the expandable styrene polymers and moldings produced from the elastic foams.

Component a) in the expandable styrene polymers comprises from 75 to 98% by weight, preferably from 85 to 93% by weight, of polystyrene and/or a styrene copolymer containing at least 50% by weight, preferably at least 80% by weight, of copolymerized styrene. Examples of suitable comonomers are α-methylstyrene, ring-halogenated styrenes, ring-alkylated styrenes, acrylonitrile, esters of acrylic or methacrylic acid with alcohols having 1 to 8 carbon atoms, N-vinylcarbazole, maleic acid, maleic anhydride and N-substituted methacrylamide. The polystyrene advantageously contains a small amount of a copolymerized crosslinking agent, ie. a compound containing more than one, preferably 2, double bonds, such as divinylbenzene, butadiene or butanediol diacrylate. The crosslinking agent is generally used in amounts of from 0.005 to 0.05 mol %, based on styrene.

In order to achieve particularly high expandability, it is expedient for the styrene polymer to have a mean molecular weight $M_w$ (weight average), measured by the GPC method, of from 100,000 to 200,000, in particular from 130,000 to 180,000. The foam has improved processing properties if the high-molecular-weight flank of the molecular-weight distribution curve measured by the GPC method is so steep that the difference between the means $(M_{z+1} - M_z)$ is less than 150,000. The GPC method is described in G. Glöckler, Polymercharakterisierung, Chromatographische Methoden, Volume 17, Hüthig-Verlag, Heidelberg, 1982. These means are described in H. G. Elias, Makromoleküle, Hüthig-Verlag, Heidelberg, 1971, pages 52–64.

Styrene polymers which have the abovementioned mean molecular weights can be obtained by carrying out the polymerization in the presence of regulators. The regulators used are expediently from 0.01 to 1.5% by weight, preferably from 0.01 to 0.5% by weight, of a bromine-free organic compound having a chain-transfer constant K of from 0.1 to 50. Addition of the regulator during the polymerization is expediently delayed until a conversion of from 20 to 90% has been reached in order to achieve a steep high-molecular-weight flank of the molecular-weight distribution curve.

An advantageously high expansion capacity can also be achieved if component a) contains from 0.1 to 10% by weight, advantageously from 0.5 to 10% by weight, of a styrene polymer having a mean molecular weight (weight average) of from 500 to 5000.

Further details on molecular-weight regulation in the preparation of expandable styrene polymers are given in EP-B 106 129.

Styrene polymers which contain from 0.1 to 2% by weight, preferably from 0.15 to 1.5% by weight, of copolymerized acrylonitrile give foams which are distinguished by substantial absence of shrinkage. A mixture of from 95 to 99.5% by weight of polystyrene and from 0.5 to 5% by weight of a styrene-soluble styrene-acrylonitrile copolymer also exhibits these properties if the total acrylonitrile content in the mixture is from 0.1 to 2% by weight, preferably from 0.15 to 2% by weight.

Styrene polymers containing from 3 to 20% by weight, preferably from 5 to 15% by weight, of copolymerized acrylonitrile give foams having high oil resistance. A mixture of from 50 to 85% by weight of polystyrene and from 15 to 50% by weight of a styrene-soluble styrene-acrylonitrile copolymer also exhibits this advantageous property if the total acrylonitrile content in the mixture is from 3 to 20% by weight, preferably from 5 to 15% by weight. Such mixtures are prepared in a simple manner by dissolving the proposed amount of styrene-acrylonitrile copolymer in styrene before the polymerization.

Styrene polymers containing from 2 to 15% by weight, in particular from 3 to 12% by weight, of maleic acid or maleic anhydride as comonomer give foams which are distinguished by high heat distortion resistance. It is advantageous to use a mixture of polystyrene and a commercially available styrene-maleic anhydride copolymer having a maleic anhydride content of from 15 to 49% by weight, which can easily be prepared by dissolving the copolymer in styrene before the polymerization.

Component b) is, in particular, a styrene-soluble elastomer having a glass transition temperature of below 20° C., preferably below −10° C., in particular below −20° C.

The elastomer is generally essentially uncrosslinked, if desired only crosslinked to the extent that the solubility in styrene is not impaired.

Preference is given for the novel styrene polymers to polybutadiene rubbers, in particular those having a molecular weight of from 200,000 to 300,000 and containing <50% of 1,4-cis structures and from 5 to 20% of 1,2-vinyl structures or from 50 to 99% of 1,4-cis structures and <5% of 1,2-vinyl structures.

The proportion of component b) is from 2 to 25% by weight, preferably 7–15% by weight. If the content is below this range, elastification of the styrene polymers is insufficient, and if it is above this range, the known problems of loss of blowing agent can occur.

The novel expandable styrene polymers have a cell particle morphology.

The elastomer is dispersed in the polystyrene phase in the form of cell particles.

The cell particles should have diameters of from 0.1 to 10 μm, in particular from 0.5 to 5 μm.

Cell particles having larger diameters result in losses of blowing agent and in irregular foam structures.

Information on the morphology of elastomer-modified styrene polymers is given in: Echte, Rubber-Toughened Styrene Polymers, Advances in Chemistry Series No. 222, 1989.

As component c), the expandable styrene polymers contain, in homogeneous distribution, from 2 to 15% by weight, preferably from 3 to 10% by weight, of a low-boiling blowing agent. The % by weight data are based on the sum of components a) and b). The blowing agent should not dissolve the polystyrene, but should be soluble in polystyrene. The boiling point should be below the softening point of the polystyrene. Examples of suitable blowing agents are propane, butane, pentane, hexane, cyclopentane, cyclohexane, octane, dichlorodifluoromethane, trifluorochloromethane and 1,1,1-difluorochloroethane. Pentane is preferred.

The expandable styrene polymers may furthermore contain effective amounts of conventional additives, such as dyes, fillers, stabilizers, flameproofing agents, synergists, nucleating agents, lubricants, antistatics, substances which have a non-stick action during foaming, and agents for shortening the demolding time on expansion.

Other suitable additives are poly(2,6-dimethyl)-1,4-phenylene ether and poly-1,4-phenylene sulfide. In amounts of from 1 to 20% by weight, based on component a), these additives increase the heat distortion resistance of the foam.

The expandable styrene polymers are generally in the form of particles, ie. in bead form or granule form, and advantageously have a mean diameter of from 0.1 to 6 mm, in particular from 0.4 to 3 mm.

The novel styrene polymers can be prepared, for example, by mixing components a), b) and, if used, c) in the melt, usually in an extruder, where, during addition of c), the extrudate must be cooled so rapidly after extrusion that foaming does not occur. The resultant styrene polymer is subsequently comminuted, usually by granulation.

However, the novel styrene polymers are advantageously prepared by interpolymerization, in which the elastomer is dissolved in styrene, and this solution is polymerized by processes known per se, usually with addition of free-radical initiators or by supply of heat.

The polymerization can be carried out by conventional bulk polymerization.

However, it is also possible to prepare the novel expandable styrene polymers by suspension polymerization.

In this case, however, it is expedient first to polymerize the solution of the elastomer in styrene to a conversion of about 30% in bulk and to convert this reaction mixture, if desired in the presence of a plasticizer, such as paraffin oil, into aqueous suspension as usual and thus to continue the polymerization.

The blowing agent can be added here during the polymerization.

In most cases, however, the blowing agent is added to the finished polymer.

This can be carried out, for example, by adding the blowing agent to the molten polymer, for example in an extruder; here too, foaming must be prevented. However, the blowing agent is advantageously added by the impregnation method.

To this end, the polymers must be comminuted to a particle size of, preferably, from 0.5×1 mm to 4×4 mm. This is expediently carried out by extrusion with subsequent granulation. Depending on the type of comminution, the granules are usually in the form of particles, ie. in bead form or pellet form.

For the impregnation, the granules are suspended in a liquid, usually water, in the presence of conventional auxiliaries and additives in a pressure container, and the latter is rendered inert and brought to a temperature which is above the softening point, but below the melting point, of the polymer. The blowing agent is injected at this temperature. After cooling, and decompression, the impregnated granules are separated off, purified and dried, preferably at room temperature or at from 30° to 50° C., for example in a stream of air. The impregnation process is described, for example, in EP-A 343 473.

Further details on conventional preparation processes are given, for example, in Kunststoffhandbuch, Volume 5, Polystyrol, edited by R. Vieweg and G. Danmiller, Carl-Hanser-Verlag, Munich, 1969.

For the production of foams, the expandable styrene polymers are expanded in a known manner by heating to temperatures above their softening point, for example by means of hot air or preferably by means of steam. The foam particles obtained can be expanded further by re-heating after cooling and, if desired, after interim storage. They can subsequently be welded to form moldings in a known manner in molds which do not seal in a gas-tight manner.

The foams obtained have densities of from about 0.01 to 0.1 g/cm$^3$. Owing to their elasticity, they are used, in particular, for impact-resistant packaging, as core material for automotive bumpers, for the internal paneling of motor vehicles, as cushioning material, and as thermal and sound insulation material.

They have excellent recovery of up to 90% on quadruple compression (determined in accordance with DIN 53 577). They are thus clearly superior to conventional styrene polymers.

The losses of blowing agent from the unfoamed beads are very low. Even after storage for several weeks, foaming was still possible without problems.

The prefoamed beads have a uniform cell structure and weld during molding without formation of voids. The moldings produced in this way have excellent heat distortion resistance.

In addition, the novel foams have a surprisingly good thermal insulation capacity; the thermal conductivity is up to 10% lower than conventional polystyrene particle foams. The foams and moldings can be recycled without problems.

The invention is illustrated in greater detail with reference to the examples below:

EXAMPLE 1

8 parts by weight of a polybutadiene having a molecular weight ($M_w$) of 250,000 and a medium-cis structure (30.4% of 1,4-cis structures) were dissolved in 92 parts by weight of styrene and subjected to free-radical polymerization by the known process.

The resultant polymer had a viscosity number of 70 cm$^3$/g, a softening temperature (Vicat B/50) of 93° C. and a melt flow index of 3.7 cm$^3$/10 min at 200° C. and 10 kg.

The polybutadiene phase was distributed in the polystyrene phase in the form of cell particles having diameters of 0.5–2.5 μm.

The polymer was melted in a known manner at about 180° C. in a twin-screw extruder from Werner & Pfleiderer, Stuttgart, and forced through a die plate having 1 mm bores. The extrudates were solidified in a water bath and subsequently granulated to a size of 1×1×3 mm by means of rotating blades.

6700 g of these granules were introduced into a 50 l stirred reactor together with 21,300 g of demineralized water, 76 g of sodium pyrophosphate, 155 g of magnesium sulfate heptahydrate and 50 g of a 40% strength solution of an alkylbenzenesulfonate (Mersolat® K 30, Bayer AG). The reactor was closed, flushed twice with 1 atm of nitrogen and heated to 120° C. with stirring at 250 rpm. When a temperature of 120° C. had been reached, 670 g (=10%, based on polystyrene) of a 4:1 mixture of n-pentane and isopentane were injected into the reactor over a period of 15 minutes, and the mixture was stirred at 120° C. for a further 10 hours. After cooling and decompression, the reactor contents were discharged. The beads were collected, washed twice with demineralized water and dried in a suction filter by sucking through ambient air (about 23° C.).

The beads, which were dry on the surface, then had a pentane content of 6.5% by weight and an internal water content of 0.25% by weight. They were placed on an open metal sheet for several days in order to investigate the change in foamability. Prefoaming was carried out by means of steam under atmospheric pressure; moldings were produced in a press measuring 20×20×4 cm into which steam could be introduced from the top and bottom.

After storage for one day, the beads had a minimum bulk density of 14.2 g/l after steam treatment for 5 minutes; the cell structure was homogeneous and fine. After standing in the open for 14 days, the minimum bulk density was 15.6 g/l after steam treatment for 5 minutes; the cell structure was slightly finer.

Moldings having a density of 20 g/l were produced from the prefoamed beads. These moldings had very good welding, had a recovery of 90% after quadruple compression by 50%, measured in accordance with DIN 53 577, and a Poensgen thermal conductivity (DIN 52 616) surprisingly reduced by 7% compared with Styropor® F14 (BASF Aktiengesellschaft) of the same density.

EXAMPLE 2

9 parts by weight of a polybutadiene having a molecular weight of 250,000 ($M_w$) and a content of 1,4-cis structures of 98% were dissolved in 91 parts by weight of styrene and polymerized and granulated as described in Example 1.

The resultant polymer had a viscosity number of 80 cm$^3$/g, a softening temperature (Vicat B/50) of 95° C. and a melt flow index of 3.4 cm$^3$/10 min at 200° C. and 10 kg. The polybutadiene phase was distributed in the polystyrene phase in the form of cell particles having a diameter of from 0.5 to 2.5 μm.

6000 g of the granules were impregnated with 720 g of the mixture of n- and isopentane and worked up and foamed as in Example 1.

The pentane content after surface drying was 8.6%, and the internal water content was 0.04%. The minimum bulk density after standing for 1 day was 11.3 g/l (after prefoaming for 7 minutes); after standing in the open for 14 days, it was 13.6 g/l. The cell structure in both cases was homogeneous and fine.

Here too, moldings having a density of 20 g/l were produced as in Example 1. The welding was excellent; the recovery after quadruple compression by 50% was 90%, and the thermal conductivity was reduced by about 7% compared with Styropor® F14, just as in the case of the moldings of Example 1.

EXAMPLE 3

13 parts by weight of a polybutadiene as used in Example 1 were dissolved in 87 parts by weight of styrene and polymerized as described in Example 1.

The resultant polymer had a viscosity number of 68 cm³/g, a softening temperature (Vicat B/50) of 95° C. and a melt flow index of 2.4 cm³/10 min. The polybutadiene phase was distributed in the polystyrene phase as cell particles having a diameter of from 0.5 to 2.5 μm.

Granules measuring about 2×2×2 mm were produced as described in Example 1.

6000 g of the granules were impregnated with 600 g of the mixture of n- and isopentane and worked up and foamed as described in Example 1.

The pentane and water contents after work-up were 6.5% by weight and 0.38% by weight respectively. The minimum bulk density after standing in the open for 1 and 3 days was 14.2 g/l and 17.4 g/l respectively (after prefoaming for 7 and 4 minutes respectively). The foam structure was homogeneous and fine and did not change significantly after extended standing/conditioning. The moldings, having a density of 22 g/l, produced from prefoamed beads had a recovery of 95% after quadruple compression by 50%; their thermal conductivity was 5% below that of Styropor® F 14 of the same density.

EXAMPLE 4

14 parts by weight of polybutadiene, as in Example 2, were dissolved in 86 parts by weight of styrene and polymerized as in Example 1.

The polymer had a viscosity number of 69 cm³/g, a softening temperature (Vicat B/50) of 91° C. and a melt flow index of 1.6 cm³/10 min at 200° C. and 10 kg. The polybutadiene phase was distributed in the polystyrene phase in the form of cell particles having a diameter of from 0.5 to 3 μm. The polymer was granulated to a size of 2×2×2 mm.

6000 g of the granules were impregnated with 600 g of the mixture of n- and isopentane, worked up and foamed as described in Example 1.

After work-up and surface drying, the product contained 5.9% by weight of pentane and 0.25% by weight of water. The minimum bulk density after standing for 1 day was 13.1 g/l after prefoaming for 5 minutes. After standing in the open for 3 days, a minimum bulk density of 17.8 g/l was obtained after prefoaming for 4 minutes. The cell structure was homogeneous and medium to fine. Moldings, having a density of 23 g/l, produced from prefoamed beads had a recovery of greater than 80% after quadruple compression by 50%; the thermal conductivity was about 5% lower than for Styropor® F 14 of the same density.

COMPARATIVE EXAMPLE 1

A mixture of 200 parts of water, 0.1 part of sodium pyrophosphate, 100 parts of a solution of 9 parts of polyisobutylene having a Staudinger index of 28 cm³/g, a glass transition temperature of −64° C. (Oppanol® B 10 from BASF Aktiengesellschaft) in 91 parts of styrene, 7.5 parts of pentane, 0.15 part of tert-butyl peroxide, 0.45 part of benzoyl peroxide and 4 parts of a 10% strength aqueous solution of polyvinylpyrrolidone was heated to 90° C. with stirring, kept at 90° C. for 5 hours and subsequently heated at 100° C. for 2 hours and at 120° C. for a further 2 hours in a pressure-tight stirred reactor. After cooling, the resultant bead polymer having a mean particle diameter of about 1 mm was separated from the aqueous phase, washed and dried.

The expandable styrene polymer obtained was prefoamed to a bulk density of about 30 g/l in a commercial stirred prefoamer, Rauscher type, by means of a stream of steam. After storage for 24 hours, the foam particles were welded in a slab mold, Rauscher type, by treatment with steam under a pressure of 1.8 bar to give a slab having a density of about 30 g/l.

After work-up, the beads had pentane and water contents of 5.6% by weight and 1% by weight respectively. After standing in the open for one day, the minimum bulk density was 32.4 g/l after prefoaming for 10 minutes. After 3 days, foam beads were no longer obtainable; the blowing agent had volatilized to a residual content of 1.8%, which was no longer effective.

A thin section through moldings (density 30 g/l) produced from the foam beads show a nonuniform foam structure (fine and coarse cells, voids); in the compression test (quadruple compression by 50%), the maximum recovery was 75–70%.

The thermal conductivity was just below the level of normal Styropor® F 14 of the same density.

COMPARATIVE EXAMPLE 2

6000 g of a commercially available, transparent, high-impact polystyrene having a melt flow index of 11 cm³/10 min at 200° C./5 kg and a softening temperature (Vicat B/50) of 59° C. (Styrolux 684 D) obtainable by anionic polymerization of a mixture of 21% of butadiene and 79% of styrene and having a morphology characterized by (approximately 25 nm) thin layers of polystyrene and polybutadiene was impregnated as granules having a particle diameter of about 2×2×2 mm with 600 g (=10%) of blowing agent as described in Example 1.

After work-up, the product had a pentane content of 3.3% by weight; the proportion of internal water was 2.32% by weight. After standing in the open for 1 day, no significant foaming was observed (bulk density 413 g/l), even after extended steam treatment (10 minutes).

It was therefore not possible to test the foam properties.

We claim:

1. An expandable styrene polymer for elastic polystyrene foams, comprising
   a) from 75 to 98% by weight of polystyrene and/or a styrene copolymer containing at least 50% by weight of copolymerized styrene,
   b) from 2 to 25% by weight of at least one styrene-soluble elastomer comprising polybutadiene rubber having a molecular weight of from 200,000 to 300,000 and containing less than 50% of 1,4-cis structures and from 5 to 20 percent of 1,2-vinyl structures or from 50 to 99 percent of 1,4-cis structures and less than 5 percent of 1,2-vinyl structures,
   c) from 1 to 15% by weight, based on the sum of a) and b), of a low-boiling blowing agent, and,
   d) conventional additives in effective amounts, where the unfoamed beads have a structure in which the elastomer phase is dispersed in the polystyrene phase in the form of cell particles.

2. An expandable styrene polymer as claimed in claim 1, which comprises from 85 to 93% by weight of component a) and from 7 to 15% by weight of component b).

3. An expandable styrene polymer as claimed in claim 1, wherein component b) is a styrene-soluble elastomer having a glass transition temperature of <20° C.

4. An expandable styrene polymer as claimed in claim 1, wherein the cell particles have a diameter of from 0.1 to 10 μm.

5. An expandable styrene polymer as claimed in claim 1, wherein the cell particles have a diameter of from 0.5 to 5 μm.

6. An elastic foam having a density of from 4 to 70 g/l, comprising a) from 50 to 98% by weight of polystyrene and/or a styrene copolymer containing at least 50% by weight of copolymerized styrene, b) from 2 to 50% by weight of at least one styrene-soluble elastomer comprising polybutadiene rubber having a molecular weight of from 200,000 to 300,000 and containing less than 50% of 1,4-cis structures and from 5 to 0 percent of 1,2-vinyl structures or from 50 to 99 percent of 1,4-cis structures and less than 5 percent of 1,2-vinyl structures, and, c) conventional additives in effective amounts.

* * * * *

UNITED STATES PATENT AND TRADEMARK OFFICE
CERTIFICATE OF CORRECTION

PATENT NO.: 5,525,636

DATED: June 11, 1996

INVENTOR(S): HENN et al.

It is certified that error appears in the above-identified patent and that said Letters Patent is hereby corrected as shown below:

Column 8, claim 1, line 56, "havinga" should read --having a--.

Column 9, claim 6, line 13 "4 to 70" should read --5 to 70--.

Column 10, claim 6, line 9, "5 to 0" should read --5 to 20--.

Signed and Sealed this

Third Day of September, 1996

Attest:

BRUCE LEHMAN

Attesting Officer

Commissioner of Patents and Trademarks